United States Patent
Morgan et al.

(10) Patent No.: US 8,075,254 B2
(45) Date of Patent: Dec. 13, 2011

(54) DEVELOPMENTS RELATING TO A ROTOR ARRANGEMENT

(75) Inventors: Jonathan J Morgan, Bristol (GB); Nigel Twiggs, Bristol (GB); Christian H Enderby, London (GB)

(73) Assignee: Rolls-Royce PLC, London (GB)

( * ) Notice: Subject to any disclaimer, the term of this patent is extended or adjusted under 35 U.S.C. 154(b) by 674 days.

(21) Appl. No.: 12/232,136

(22) Filed: Sep. 11, 2008

(65) Prior Publication Data
US 2009/0081028 A1   Mar. 26, 2009

(30) Foreign Application Priority Data
Sep. 21, 2007  (GB) .................... 0718431.0

(51) Int. Cl.
*F01D 5/00* (2006.01)
*F01D 9/00* (2006.01)
*F01D 11/00* (2006.01)
*F01D 25/16* (2006.01)
*F01D 29/08* (2006.01)
*F01D 29/18* (2006.01)

(52) U.S. Cl. .................... 415/170.1; 415/115

(58) Field of Classification Search .......... 514/115, 514/170.1, 134, 135, 175; 415/115, 170.1, 415/134, 135, 175
See application file for complete search history.

(56) References Cited

U.S. PATENT DOCUMENTS

| 3,917,150 | A | | 11/1975 | Ferguson et al. |
| 4,187,064 | A | * | 2/1980 | Wheeler ........................ 418/187 |
| 5,593,274 | A | * | 1/1997 | Carreno et al. ............... 415/115 |
| 6,120,622 | A | | 9/2000 | Mayr et al. |
| 2006/0210392 | A1 | * | 9/2006 | Enderby .................... 415/170.1 |

FOREIGN PATENT DOCUMENTS

| EP | 1 108 926 A1 | 6/2001 |
| EP | 1 918 525 A2 | 5/2008 |
| GB | 2 367 099 A | 3/2002 |

OTHER PUBLICATIONS

Sep. 8, 2010 Extended Search Report issued in European Patent Application No. 08015760.5.

* cited by examiner

Primary Examiner — David Nhu
(74) Attorney, Agent, or Firm — Oliff & Berridge, PLC

(57) ABSTRACT

A rotor arrangement has a rotor-section and a circumferential moveable seal around the rotor-section. The arrangement being such that, for a given rotation rate, the rotor-section is subject to an associated radial growth and a corresponding related axial displacement, relative to the seal. The rotor-section is provided with an axially-varying profile for offsetting said radial growth of the rotor-section, adjacent the circumferential seal, at said given rotation rate.

11 Claims, 4 Drawing Sheets

DEVELOPMENTS RELATING TO A ROTOR ARRANGEMENT

This application claims priority to United Kingdom Patent Application No. 0718431.0 filed in the United Kingdom on Sep. 21, 2007, the entire disclosure of which is incorporated by reference herein in its entirety.

BACKGROUND

The present invention relates to a rotor arrangement of the general type including a rotor-section, for example a section of a turbine shaft, and a circumferential sealing element around the rotor section, the rotor section being provided with a sealing surface for co-operating with the sealing element.

It is necessary in many rotor applications to provide a moveable seal around at least part of the circumference of a rotor-section, for example to isolate relatively high-pressure and low-pressure stages along the rotor-section. Such circumferential seals are conventionally formed between a sealing surface of the rotor-section and an annular sealing element; the sealing-element should optimally be capable of maintaining the seal whilst nevertheless allowing the rotor-section to rotate, relative to the sealing-element, as freely as possible.

A problem associated with circumferential rotor-seals is that, because the sealing-element is necessarily not fixed to the rotor-section, the rotor-section and the sealing-element may be subject to relative movement during operation of the rotor arrangement. Such relative movement may occur due to eccentric movements of the rotor-section, relative to the sealing-element, and/or as a result of concentric radial growth of the rotor-section, such as "centrifugal growth" caused by the rotational speed of the rotor-section and/or thermal growth caused by high operating temperatures.

Relative movement between the rotor-section and sealing-element can result in severe rubbing between the rotor section and sealing element, along the seal, which can in turn have a critical effect on the wear, performance and ultimately the integrity of the seal.

Various types of circumferential seal-assemblies have been developed to try to address the problem of relative operative movement between a rotor-section and the corresponding circumferential sealing-element. One such type of seal-assembly is the brush-seal assembly, disclosed in general terms in U.S. Pat. No. 3,917,150, which incorporates a brush seal element including an annulus of densely packed, flexible, metal or ceramic bristles that form a circumferential seal around the rotor-section; the bristles project inwardly towards the rotor-section from a rigid annular carrier fixed to the rotor casing and seal against the external surface of the rotor-section.

Generally speaking, these brush-seal assemblies can accommodate a relatively small degree of relative movement between the rotor-section and the fixed annular carrier through flexing of the bristles, whilst nevertheless maintaining the overall integrity of the seal. However, any appreciable relative movement has the effect of subjecting the bristles to a high radial load and the bristles consequently wear quickly, critically affecting sealing performance.

In so-called "floating" brush-seal assemblies, such as those disclosed in US 2006/0210392A1, the annular carrier is mounted to slide with the rotor-section in a radial direction so as to maintain the separation between the annular carrier and rotor-section, thereby significantly reducing any eccentric movement of the rotor-section relative to the annular carrier. However, whilst such floating brush-seal assemblies can reduce radial loading of the bristles specifically as a consequence of eccentric movement of the rotor-section, they do nothing to address the distinct problem of radial loading of bristles due to the concentric radial growth of the rotor-section, so that appreciable concentric growth of the rotor-section may nevertheless result in rapid bristle-wear and consequent poor sealing performance.

SUMMARY

It is an object of the present invention to seek to provide an improved rotor arrangement.

According to one embodiment of the present invention, there is provided a rotor arrangement having a rotor-section and a circumferential sealing-element around the rotor-section. In operation, rotation of the rotor-section is accompanied by radial growth of the rotor-section and by axial displacement of the rotor-section relative to the sealing-element. The rotor-section is provided with a sealing surface for co-operation with the sealing-element. The profile of the sealing surface being such that, at a given operational rotation speed of the rotor, the accompanying radial growth of the rotor-section adjacent the sealing-element is substantially compensated for, or offset, by the corresponding axial displacement of the rotor-section. Thus, it has been found that for certain rotor applications, for example turbine applications where a rotor-section is subject to an axial thrust, there will be a correlative relationship between, on the one hand, axial movement of the rotor-section due to the axial thrust at a given rotation speed and, on the other hand, radial growth of the rotor accompanying rotation of the rotor at that rotation speed. The present embodiment makes use of this relationship to seek to address the problem of radial loading of a corresponding circumferential sealing-element due to concentric radial growth of the rotor-section.

The rotor-section may be operable at a range of rotation speeds, in which case said profile may be configured such that, across the range of rotation speeds, the respective accompanying radial growth of the rotor-section adjacent the sealing-element is compensated for by the corresponding respective axial displacement of the rotor-section.

Optionally, the circumferential seal is in the form of a brush seal assembly, which may be a floating brush seal assembly. The brush seal assembly may have an annular backing plate, the inner edge of the backing plate being abradable.

The inner face of the sealing element may be configured for complementary mating engagement with the sealing surface of the rotor-section.

According to a further aspect of the present invention, there is provided a method of determining the profile of a rotor-section for use in a rotor arrangement including a circumferential sealing-element around the rotor-section which co-operates with a sealing surface provided on the rotor-section, the arrangement being such that, in operation, rotation of the rotor-section will be accompanied by radial growth of the rotor-section and by axial displacement of the rotor-section relative to the sealing-element.

The method includes estimating the accompanying radial growth and corresponding axial-displacement of the rotor-section at a given operational rotation speed. The method further includes, based on said estimate, determining a profile for the sealing-surface such that, at the given operational rotation speed of the rotor, the accompanying radial growth of the rotor-section adjacent the circumferential sealing-element will be substantially compensated for by the corresponding axial displacement.

The rotor-section may have a range of operational rotation speeds, in which case the step of estimating the accompanying radial growth and corresponding axial displacement of the rotor-section includes estimating the accompanying radial growth as a function of the corresponding axial displacement of the rotor, and the step of determining a profile for the sealing-surface based on said estimate includes determining a profile such that, across the range of operational speeds, the respective accompanying radial growth of the rotor-section adjacent the circumferential sealing-element will be substantially compensated for by the corresponding axial displacement, According to another aspect of the present invention, there is provided a rotor-section for use in a rotor arrangement, wherein at least part of the sealing surface of the rotor-section includes a frusto-conical profile. In one embodiment, the frusto-conical profile may represent a transition section between regions of the sealing surface having different diameters.

BRIEF DESCRIPTION OF THE DRAWINGS

So that the invention may be more readily understood, embodiments of the invention will now be described, by way of example, with reference to the accompanying drawings, in which.

DETAILED DESCRIPTION OF EMBODIMENTS

Figure 1:
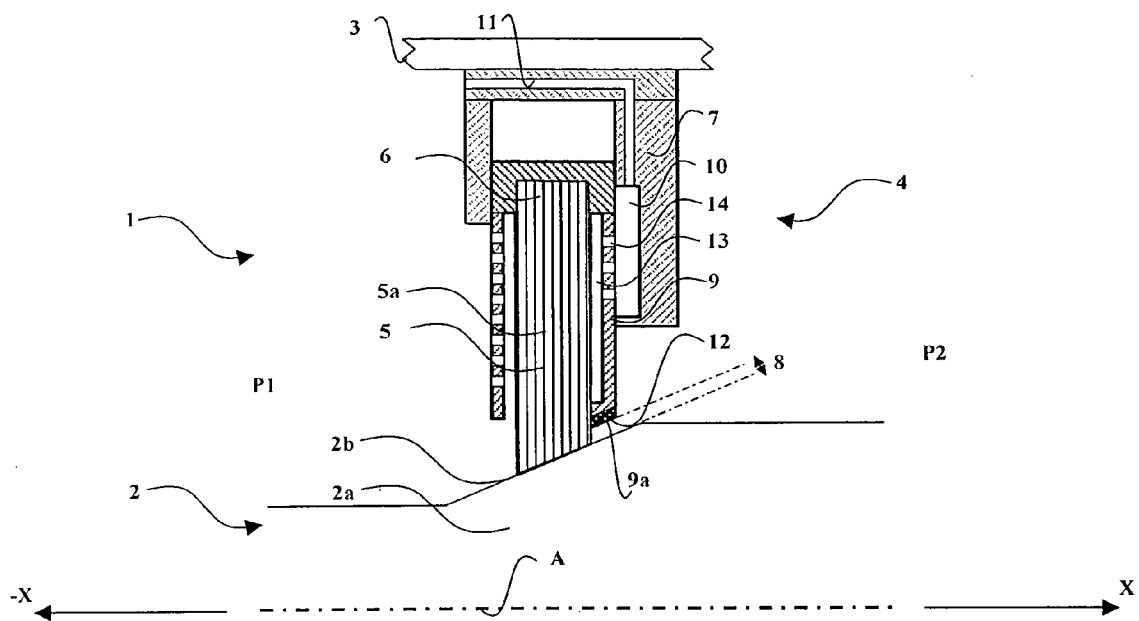
FIG. 1 is a schematic side view of radial cross-section of a rotor first arrangement.

FIG. 1 shows a rotor arrangement 1 incorporating a rotor-section 2 including a frusto-conical sub-section 2a, rotatable around an axis A within a rotor casing 3. The rotor-section 2 forms part of a turbine shaft (not shown), which is operable at a range of rotation speeds.

A seal assembly, in the form of an annular seal assembly 4, is fixedly mounted to the rotor casing 3 to provide a moveable circumferential seal between the rotor-section 2 and the rotor casing 3, in this case separating a relatively high-pressure, upstream region $P_1$ (on the left of the seal assembly in FIG. 1) from a relatively low-pressure down stream region $P_2$ (to the right of the seal assembly in FIG. 1). In FIG. 1, the seal assembly 4 is shown in a pre-operative "rest" position relative to the rotor-section 2.

The annular seal assembly 4 is in the form of a pressure-balanced, "floating" brush-seal assembly of generally conventional construction. Very briefly, the seal assembly 4 includes a brush seal element in the form of an annular seal-pack 5 having bristles 5a that seal against the rotor-section 2 to form a circumferential seal around the rotor-section 2. The bristles 5a, which may be metal or ceramic, are arranged in conventional manner at a "lay-angle" to the radius of the rotor-section 2 (looking end-on along axis A). The bristles 5a are not themselves fixedly attached to the rotor casing 3, but are instead held by an annular slide ring 6 which is slidably mounted to an annular mounting ring 7 fixed to the rotor casing 3.

The annular seal-pack 5 thus effectively "floats" between the rotor-section 2 and the rotor casing 3, with any eccentric movement of the rotor-section 2, relative to the rotor casing 3, being accommodated by corresponding radial sliding movement of the seal-pack 5.

In order to support the bristles 5a against axial loading (along the axis A), an annular backing plate 9 is provided in conventional manner behind the downstream face of the seal-pack 5. The backing plate 9 is fixedly attached to the slide ring 6, for sliding movement with the seal-pack 5, and extends inwardly to form an annular gap 8 between the rotor-section 2 and the inner end 9a of the backing plate 9.

"Pressure-balancing" of the seal assembly 4 is achieved by means of a plenum 10 adjacent the backing plate 9. The plenum 10 is maintained at a pressure substantially equal to the high pressure side of the seal assembly, via through-passages 11 running between the plenum 10 and the high pressure region, so as to reduce sliding friction between the slide ring 6 (and/or backing plate 9) and the mounting ring 7, in known manner. "Pressure balancing" of the seal-pack 5 is also achieved by means of a plenum 13 adjacent the seal-pack 5. The plenum 13 is maintained at a pressure substantially equal to the high pressure side of the seal assembly, through passages 14 running between plenum 10 and plenum 13, so as to reduce sliding friction between the seal-pack 5 and the backing plate 9.

The seal assembly 4 differs from conventional brush-assemblies in that the inner end of the backing plate 9 (nearest the rotor-section 2) is provided with an annular abradable layer 12 for rubbing engagement with the rotor-section 2 in the case where relative movement of the rotor-section 2 and the inner end of the backing plate 9 exceeds the width of the annular gap 8.

The seal may be provided with anti-rotation means to prevent relative rotation between the seal-pack 5 and annular mounting ring 7. The anti-rotation means may have at least one pin fixed to the annular mounting ring 7 and at least one cooperating recess in the seal-pack 5 or at least one pin fixed to the seal-pack 5, and at least one cooperating recess in the annular mounting ring 7.

The seal assembly 4 differs from a normal "floating" brush seal assembly in that the inner face of the seal-pack 5, defined by the tips of the bristles 5a, is specifically formed for mating, sealing engagement with the frusto-conical surface of the rotor-section 2.

During operation of the rotor arrangement shown in FIG. 1, the rotor-section 2 is subject to accompanying radial growth, for example "centrifugal" growth, which will depend at least in part on the rotation speed of the corresponding turbine shaft. In addition, the rotor-section 2 is subject to a corresponding accompanying axial displacement (being a displacement from the initial pre-operative "rest" position shown in FIG. 1), which again will depend at least in part on the rotation speed of the turbine shaft. It will be appreciated that during axial displacement of the rotor-section 2, the rotor-section will move longitudinally relative to the seal-pack 5, so that the seal-pack 5 will seal against a different part of the surface of the rotor-section depending upon the axial displacement.

The surface over which the seal-pack 5 may co-operate with the rotor-section 2 during operation of the arrangement can be considered to be a sealing surface; it will be appreciated that the sealing surface is particular to the rotor arrangement, effectively being defined by the extremes of longitudinal movement of the rotor-section relative to the sealing element during operation of the arrangement. In the embodiment shown in FIG. 1, the sealing surface corresponds to the surface 2b of the frusto-conical sub-section 2a of the rotor-section 2.

The specific profile of the sealing surface 2b rotor-section 2 is pre-determined on the basis of an estimate of the relationship between radial growth of the rotor-section 2 and the corresponding axial displacement of the rotor-section 2 (along the axis A), such that, across the range of rotation speeds of the rotor-section 2, the respective accompanying radial growth adjacent the seal-pack 5 is compensated for by the corresponding respective axial displacement of the rotor-section relative to the seal-pack 5.

The profile of the sealing surface 2b is thus determined as follows:

An estimate is initially made of the radial growth of the rotor-section 2 as a function of its axial displacement during operation of the rotor arrangement 1 across a relevant range of operational rotation speeds for the rotor-section. The estimate may be obtained using conventional methods, for example conventional modeling techniques and/or empirical test data. (It should be noted that whereas the axial displacement is largely independent of the profile of the rotor-section 2, the radial growth could be influenced by the profile in certain arrangements, particularly where the profile is situated on a thin rotor land.)

Figure 2:
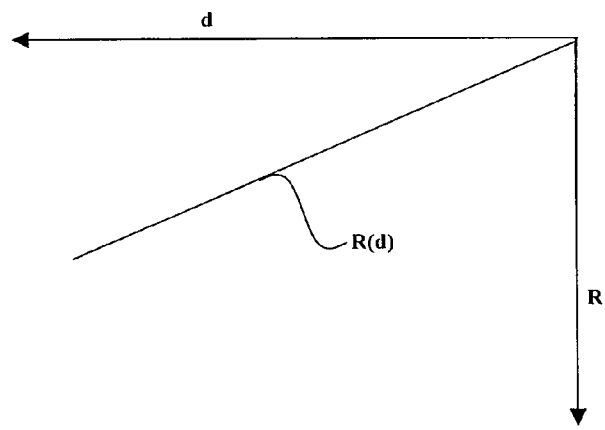
FIG. 2 is a graph illustrating the relationship between operative radial rotor-section growth and corresponding axial rotor-section displacement for the rotor arrangement of FIG. 1.

The radial growth R of the rotor-section 2 as a function of its axial displacement d is shown schematically in FIG. 2 as R(d). Referring to FIG. 2, it will be noted that, for rotor arrangement 1, R(d) is directly proportional to d, that is the radial growth R increases linearly with increasing axial displacement d of the rotor-section 2 in the direction X along axis A.

Based on the estimated relationship shown in FIG. 2, a suitable profile is then determined for the sealing surface 2b, which will substantially compensate for the predicted radial growth of the rotor adjacent the seal pack 5, across the range of operational rotation speeds.

Thus, a frusto-conical profile is determined for the sealing surface 2b, having a varying diameter which decreases linearly in the direction −X (that is, opposite to the direction X) in accordance with R(d).

Once a suitable axially-varying profile has been determined for the sealing surface 2b, the remaining steps of manufacturing rotor-section 2, having a suitably profiled sealing surface 2b, may be carried out in conventional manner.

Referring to FIG. 1, it will be appreciated that when the rotor-section 2 is subject to axial displacement d in the direction X, due to the rotational speed of the turbine shaft, the seal assembly 4 will effectively move a distance d relative to the rotor-section 2 in the direction −X. Provided an accurate pre-determination of R(d) in accordance with the above described method, the linear radial growth of the rotor-section 2 for a given displacement d of the rotor-section 2 in the X direction will be entirely or at least substantially compensated for by the corresponding linear decrease in the pre-determined diameter of the rotor-section 2, defined by the sealing surface 2b, for displacement d of the seal assembly in the −X direction. The result is that the diameter of the rotor-section 2 adjacent the seal pack 5, as "seen" by the seal pack 5, will remain substantially constant.

It will be appreciated that, because the radial growth of the rotor-section 2 adjacent the seal-pack 5 is at least substantially compensated for by the profile of the sealing surface 2b rotor-section 2, radial loading of the bristles 5a during operation of the rotor arrangement can consequently be maintained within preferred operational limits and tolerances for the arrangement, with a likely corresponding reduction in operational wear of the bristles 5a over time as compared to conventional rotor arrangements.

In addition, in so far as radial movement of the sealing surface 2b, relative to the seal assembly 4, is reduced adjacent the seal pack 5. It will be appreciated that the annular gap 8 need not be dimensioned to accommodate such relative radial movement.

Consequently, the annular gap 8 may in principle be narrower than in conventional rotor arrangements without there being any attendant increase in the risk of the rotor-section striking against the backing plate 9, so that the inner end of the backing plate 9 can advantageously be configured to supports the bristles 5a closer to the tips of the bristles 5a. There are numerous advantages to supporting the bristles 5a closer to their tips. For example, the axial load on the bristles 5a under pressure-loading is reduced, reducing the bristle bending stresses and maximum "pressure balancing" of the seal pack 5 is possible reducing bristle tip loads during contact. The overall result will be reduced wear, reduced leakage, or alternatively greater pressure difference capability.

Indeed, where the inner end of the backing plate 9 is provided with an abradable layer 9a, as in FIG. 1, it is envisaged that the annular gap 8 can in principle be almost completely eliminated, with any relative concentric movement of the rotor-section 2 and seal assembly 4 being taken up by abrasion of the abradable layer 9a. In the case of the embodiment shown in FIG. 1, eccentric movement of the rotor 1 relative to the rotor casing 3 will be accommodated by the floating seal assembly 4.

The precise profile, which is determined for the sealing surface 2b, will depend upon R(d) and may not necessarily be linear. Indeed, the profile of the rotor-section 2 may be concave, convex or of any other specific geometry, provided that is suitable to substantially compensate for the pre-estimated radial growth of the rotor-section 2.

Figure 3:
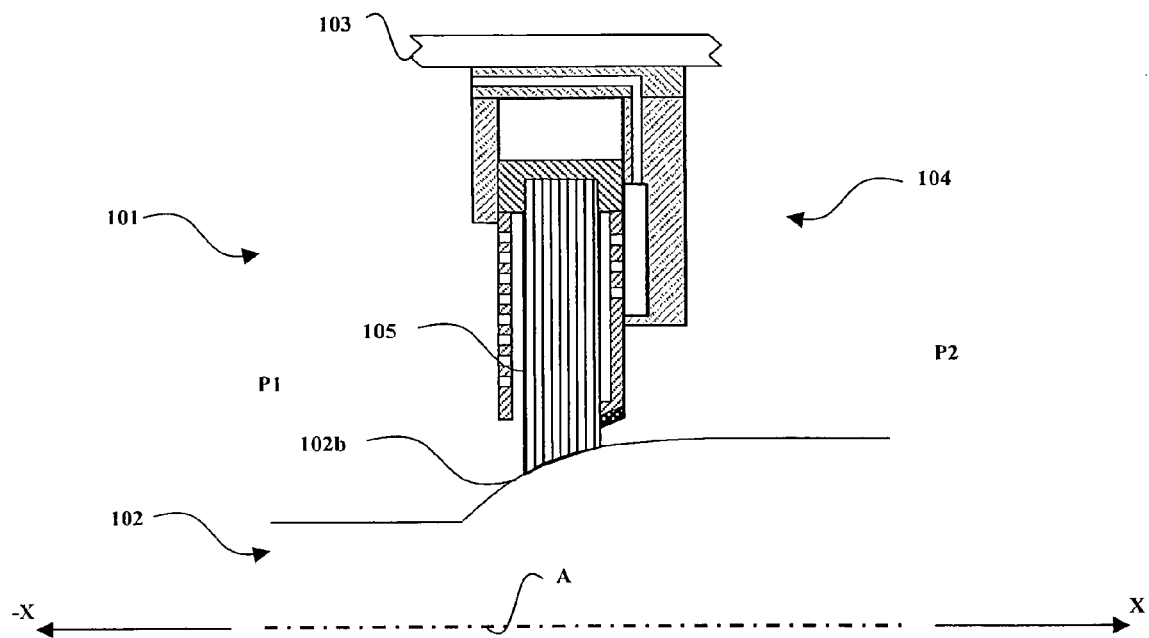
FIG. 3 is a schematic cross-sectional side view showing part of a second rotor arrangement.

FIG. 3 shows a second rotor arrangement 101, wherein the variation in diameter of the sealing surface 102b of the rotor-section 102 along the axis A is non-linear. For conciseness, only a radial cross-section of the rotor arrangement 101 is shown in FIG. 3, it being understood that the rotor-section 102 and seal assembly 104 have generally circular symmetry about the axis A, similar to the arrangement in FIG. 1.

The rotor arrangement 101 is similar in general terms to the rotor arrangement 1, incorporating the rotor-section 102 and mounted for rotation within a rotor casing 103, and a seal assembly 104.

The seal 104 is generally similar to the seal assembly 4. The inner face of the seal pack 105 may optionally be formed to mate with the profile of the sealing surface 102b at some specific operational rotation speed, in similar manner to the seal pack 5 and rotor-section 2 in FIG. 1, though it may not mate perfectly through the full range of operational rotation speeds. In low pressure difference applications, a narrower seal-pack 105 could be used to minimise any mismatch. In applications with larger axial movements in comparison to radial movements, this mismatch will also be reduced. The inherent flexibility of the seal-pack 105 should also accommodate some of the mismatch through the range.

Figure 4:
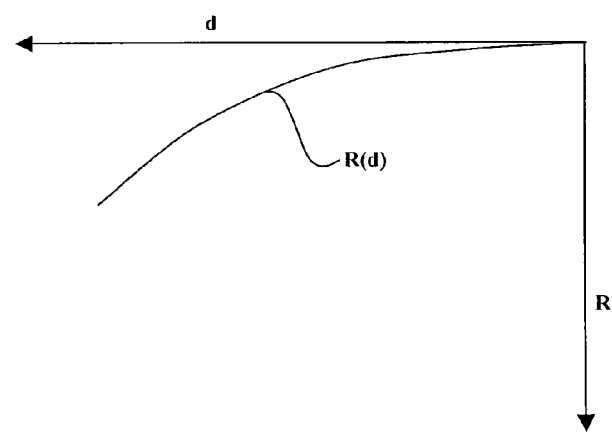
FIG. 4 is a graph illustrating the relationship between operative radial rotor-section growth and corresponding axial rotor-section displacement for the rotor arrangement of FIG. 3.

The radial growth R of the rotor-section 102 as a function of its axial displacement d is shown schematically in FIG. 4.

In this case it will be noted that R(d) increases non-linearly with increasing axial displacement of the rotor 102 in the direction X along axis A.

Based on the estimated function R(d) shown in FIG. 4, a suitable profile can be pre-determined for the sealing surface 102b of the rotor-section 102 which will at least substantially compensate for the predicted radial growth of the rotor-section 102 adjacent the seal-pack 105. The specific pre-determined profile for the sealing surface 102b is illustrated in FIG. 3 and FIG. 4.

There need not be only one suitable profile for the corresponding rotor-section in a given rotor arrangement having radial growth function R(d). Different profiles for the rotor-section may be determined, for example in accordance with further specific operational parameters for the rotor arrangement.

Figure 5:
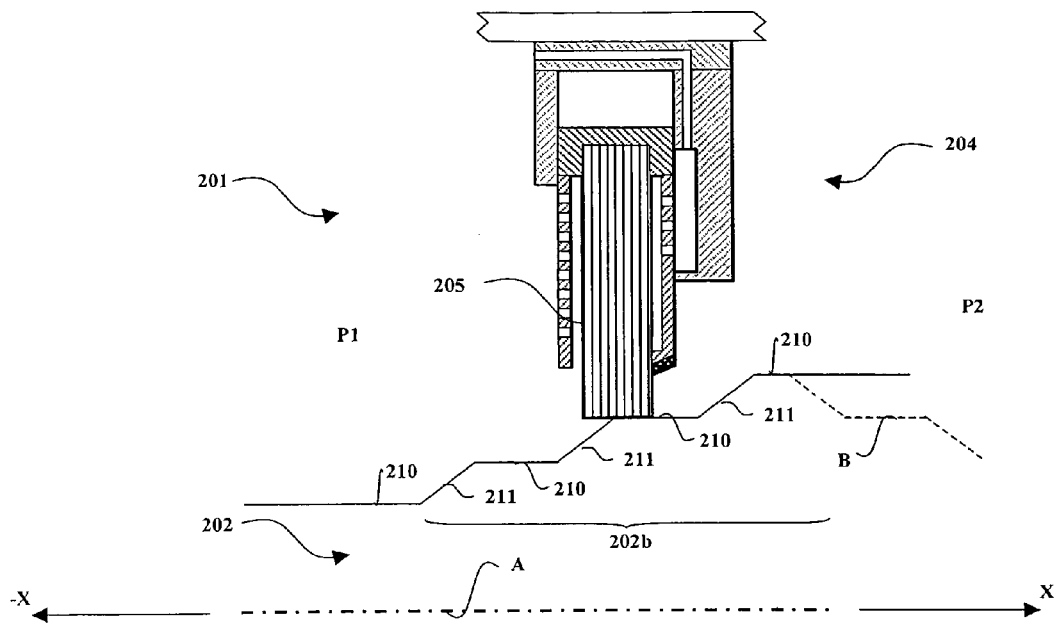
FIG. 5 is a schematic cross-sectional side view showing part of a third rotor arrangement.

FIG. 5 illustrates a radial cross-section of a third alternative rotor arrangement 201 having the same estimated radial growth function R(d) as the rotor arrangement 1 (see FIG. 2) but intended for sustained operation at only a predetermined discrete set of rotation speeds, rather than over a continuous range of rotation speeds.

In this case, the sealing surface 202b, defined in this case by the exterior surface of the rotor-section 202, includes a "stepped" profile, based on the estimated radial growth function R(d) shown in FIG. 2, rather than the continuous linear profile shown in FIG. 1.

The stepped profile of the sealing surface 202b is formed by a series of regions of different diameters, which in this case are cylindrical sub-sections 210, interposed with linear "ramped" transition sections 211, which in this case are frusto-conical in shape The number of cylindrical sub-sections 210 corresponds to the number of discrete rotation rates for the rotor 201, and the sub-sections 210 are spaced axially from the initial "rest" position of the seal-pack 205, shown in FIG. 5, so that for each one of the set of discrete rotation speeds, the corresponding axial displacement of the rotor-section 202 will serve to axially align the seal-pack 205 with one of the cylindrical sections 210. The diameter of the cylindrical sections 210 decreases linearly in accordance with R(d) along the direction −X.

During sustained periods of operation, the rotor arrangement 201 will be operating at a given one of the discrete rotation speeds and the rotor-section 202 experiences both axial displacement along the direction X and radial growth. Provided the estimate of R(d) is sufficiently accurate, the axial displacement of the rotor-section 202 will be sufficient to axially-align the seal-pack 205 with one of the cylindrical sections 210. At the same time, the corresponding pre-determined diameter of the aligned cylindrical section 210 will off-set radial growth of the rotor-section 202 adjacent the seal-pack 205. The seal-pack 205 will thus "see" little or no radial rotor-section growth during sustained operation; axial loading and consequent wear of the bristles 205a will therefore tend to be reduced.

On the other hand, during operation of the rotor arrangement 201 at a rotation rate other than one of the discrete rotation rates, for example during transition of the rotor between two of the discrete rotation rates, the transition sections 211 will nevertheless serve to maintain sealing engagement with at least part of the seal pack 205.

It will be appreciated that, because the cylindrical sections 210 present a "flat" sealing surface, a conventional flat-ended seal pack 205 may be used for mating engagement with the cylindrical sections 210. At the same time, the stepped profile of the rotor-section 202 acts to off-set radial growth of the rotor-section 202, adjacent the seal-pack 205, during sustained periods of operation, whilst nevertheless maintaining sealing engagement with at least part of the seal-pack 205 during transitional rotation rates.

Although in the embodiment in FIG. 5 the sealing surface 202b is defined by a plurality of cylindrical sections 210, it should be appreciated that, in general, the sealing surface might be defined by only a pair of regions having different diameters, the first region cooperating with the corresponding sealing element when the rotor section is at rest, and the second region cooperating with the sealing element when the rotor section is rotating at a certain rotation speed and accompanying radial growth and corresponding axial displacement of the rotor section has occurred. In general terms, it will be appreciated that in the case where sustained operation of the rotor section is only at a single operational rotation speed, the profile of the relevant sealing surface can be determined on the basis of an estimation of accompanying radial growth and corresponding axial displacement at the single, sustained operational rotation speed, without the need to determine radial growth as a function of axial displacement across a range of rotation speeds. The resulting sealing surface profile need then only incorporate two "fixed points", namely a first set diameter for cooperating with the sealing element when the rotor section is at rest and a second set diameter, axially displaced from the first set diameter, for cooperating with the sealing element when the rotor section is rotating at the single operational rotation speed (it being understood that rotation of the rotor section at speeds other than the single operational rotation speed will only occur for a relatively short period of time, for example during the transition from rest to the single operational rotation speed).

It will be appreciated that the rotor-section 2, 102 and 202 may define a respective sealing surface which has an axially-varying profile configured to substantially compensate for radial growth in the case of bi-directional axial displacement of the rotor-section from an initial rest position, that is in the direction −X as well as the direction X. For example, the profile of the sealing surface 202a may additionally be "stepped" downstream of the initial rest position of the seal-pack as indicated by the dotted line B in FIG. 5.

Figure 6:
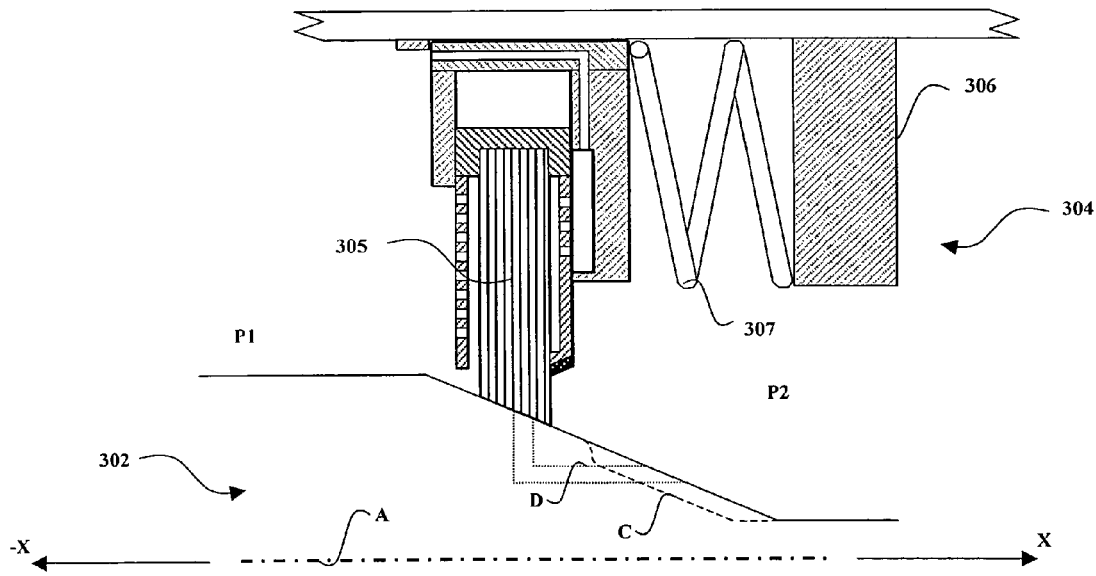
FIG. 6 is a schematic cross-sectional side view showing part of a fourth rotor arrangement.

FIG. 6 illustrates a radial cross-section of a fourth alternative arrangement, whereby the axial movement is brought about by mounting the seal assembly in a flexible carrier 306, such that the pressure difference across the seal generates axial movement of the seal assembly. This would allow the current invention to be used in applications where there is insufficient axial movement of the rotor, or where it is preferred to link the radial growth of the rotor to the pressure cycle, rather than, or in combination with, the speed of the rotor. In applications where the pressure difference is in the opposite direction to the rotor axial movement, this arrangement could be used to increase the total axial movement between the rotor and the seal.

The flexible carrier 306 may utilize a spring 307 or other flexible member.

Additionally, incorporation of a relief in the profile on the rotor 302, as shown as dotted line C in FIG. 6, could further control the axial position of the seal assembly whereby, as the inner face of the seal-pack 305 moves past the start of the relief, the sealing is instantaneously reduced, reducing the pressure difference across the seal, which in turn would reduce the axial load on the seal, and bring the seal back. Some damping of the seal mounting may be required to prevent unwanted vibrational behaviour. This could alternatively be achieved by means of bleed holes as shown as dotted line D in FIG. 6.

Figure 7:
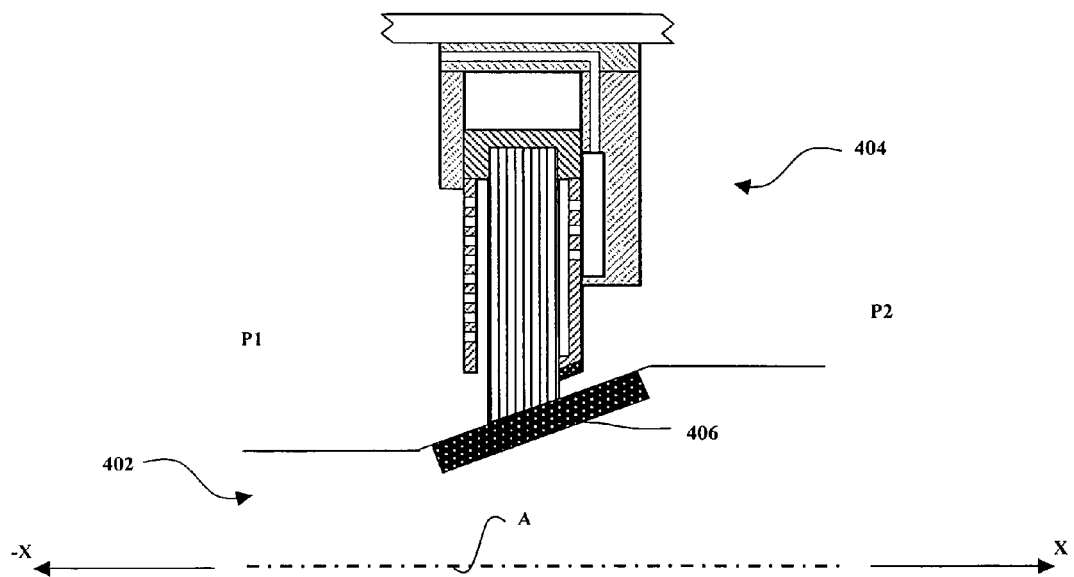
FIG. 7 is a schematic cross-sectional side view showing part of a fifth rotor arrangement.

FIG. 7 illustrates a radial cross-section of a fifth alternative arrangement, whereby the rotor 402 incorporates an abradable section 406 such that the prediction of radial and axial movements is not so critical. With a sufficiently soft abradable, the seal could effectively machine its own profile on the 1st run of the engine. This would take out any of the uncertainties in predicting the movements.

Although the seal assemblies 4, 104 and 204, 304 & 404 are in the form of floating brush seal assemblies, it will be appreciated that any suitable circumferential seal assembly, for example brush seal, pressure-balanced brush seal or leaf seal, may be used in conjunction with a rotor-section being provided with a sealing surface having a suitable profile in accordance with the invention.

Although the seal assemblies 4, 104, 204, 304 & 404 show the axial movement of the rotor to the right, it is equally possible that the axial movement of the rotor could be to the left, and in which case, the rotor profile and the inner face of the seal-pack would be reversed.

Although the seal assemblies 4, 104, 204, 304 & 404 show the upstream pressure region to the left and the downstream pressure to the right, it is equally possible that the upstream pressure could be to the right and the downstream pressure to the left, and in which case, the seal assembly would be reversed, except the inner face of the seal-pack. The position of upstream and downstream regions and the direction of movement of the rotor are independently variable.

The invention claimed is:

1. A rotor arrangement comprising:
 a rotor-section and a circumferential sealing-element around the rotor-section, wherein, in operation, rotation of the rotor-section is accompanied by radial growth of the rotor-section and by axial displacement of the rotor-section relative to the circumferential sealing-element, the rotor-section having a sealing surface for co-operation with the circumferential sealing-element,
 a profile of the sealing surface being such that, at a given operational rotation speed of the rotor, the accompanying radial growth of the rotor-section adjacent the circumferential sealing-element is substantially compensated for by a corresponding axial displacement of the rotor-section.

2. A rotor arrangement according to claim 1, wherein the rotor-section is operable at a range of rotation speeds, and said profile is configured such that, across the range of rotation speeds, the respective accompanying radial growth of the rotor-section adjacent the circumferential sealing-element is compensated for by the corresponding respective axial displacement of the rotor-section.

3. A rotor arrangement according to claim 1, wherein the circumferential sealing-element is selected from a list of sealing elements including a brush-seal, a pressure balanced brush-seal and a leaf-seal.

4. A rotor arrangement according to claim 1, wherein the circumferential seal-element is a floating seal.

5. A rotor arrangement according to claim 1, wherein the circumferential seal-element is a floating seal and comprises an annular backing plate having an inner edge, the inner edge of the backing plate being abradable.

6. A rotor arrangement according to claim 1, the circumferential seal-element is having an inner face configured for complementary mating engagement with the sealing surface.

7. A rotor arrangement according to claim 1, wherein the rotor-section incorporates an abradable section.

8. A rotor arrangement according to claim 1, wherein at least part of the sealing surface has a frusto-conical profile.

9. A rotor arrangement according to claim 8, wherein the frusto-conical profile forms a transition section between regions of the sealing surface having different diameters.

10. A method of determining the profile of a rotor-section for use in a rotor arrangement including a circumferential sealing-element around the rotor-section which co-operates with a sealing surface provided on the rotor-section, wherein, in operation, rotation of the rotor-section is accompanied by radial growth of the rotor-section and by axial displacement of the rotor-section relative to the circumferential sealing-element, the method comprising:
 estimating the accompanying radial growth and corresponding axial-displacement of the rotor-section at a given operational rotation speed; and
 based on said estimate, determining a profile for the sealing-surface such that, at the given operational rotation speed of the rotor, the accompanying radial growth of the rotor-section adjacent the circumferential sealing-element is substantially compensated for by a corresponding axial displacement.

11. A method according to claim 10, wherein
 estimating the accompanying radial growth and corresponding axial displacement of the rotor-section comprises estimating the accompanying radial growth across a range of operational rotation speeds, as a function of the corresponding axial displacement of the rotor, and
 determining a profile for the sealing-surface based on said estimate comprises determining a profile such that, across the range of operational speeds, the respective accompanying radial growth of the rotor-section adjacent the circumferential sealing-element will be substantially compensated for by the corresponding axial displacement.

* * * * *